United States Patent
Kawada (10) Patent No.: US 10,442,700 B2
(45) Date of Patent: Oct. 15, 2019

(54) POSITIVE ELECTRODE ACTIVE MATERIAL FOR NON-AQUEOUS ELECTROLYTE SECONDARY BATTERIES AND NON-AQUEOUS ELECTROLYTE SECONDARY BATTERY

(71) Applicant: Panasonic Intellectual Property Management Co., Ltd., Osaka (JP)

(72) Inventor: Hiroshi Kawada, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 687 days.

(21) Appl. No.: 14/620,816

(22) Filed: Feb. 12, 2015

(65) Prior Publication Data
US 2015/0243980 A1 Aug. 27, 2015

(30) Foreign Application Priority Data
Feb. 27, 2014 (JP) .................................. 2014-036274

(51) Int. Cl.
*H01M 4/00* (2006.01)
*C01G 53/00* (2006.01)
(Continued)

(52) U.S. Cl.
CPC ......... *C01G 53/50* (2013.01); *C01G 45/1257* (2013.01); *H01M 4/362* (2013.01); (Continued)

(58) Field of Classification Search
CPC ... C01G 53/50; C01G 45/1257; H01M 4/505; H01M 4/362; H01M 4/485; H01M 4/525
See application file for complete search history.

(56) References Cited

U.S. PATENT DOCUMENTS

2010/0104944 A1\* 4/2010 Saito ..................... H01M 4/131
429/223
2010/0173202 A1 7/2010 Saito et al.

FOREIGN PATENT DOCUMENTS

| CN | 101573813 A | 11/2009 |
| CN | 101689631 A | 3/2010 |

(Continued)

OTHER PUBLICATIONS

English Translation of Chinese Search Report dated Apr. 25, 2018 for the related Chinese Patent Application No. 201410777656.4.
(Continued)

*Primary Examiner* — Nicholas P D'Aniello
(74) *Attorney, Agent, or Firm* — McDermott Will & Emery LLP (57) ABSTRACT

An exemplary embodiment of the present disclosure resides in a positive electrode active material for non-aqueous electrolyte secondary batteries including a $Li_2MnO_3$—$LiMO_2$ solid solution {M is at least one metal element} which shows two peaks in an X-ray diffraction pattern each having a peak top at a diffraction angle of 18° to 19° and satisfying $0.001 < R_{(B/A)} < 0.03$, the $R_{(B/A)}$ is the ratio of the intensity B of one of the peaks on the higher angle side to the intensity A of the other peak on the lower angle side.

8 Claims, 5 Drawing Sheets

(51) Int. Cl.
*H01M 4/485* (2010.01)
*H01M 4/525* (2010.01)
*C01G 45/12* (2006.01)
*H01M 4/36* (2006.01)
*H01M 4/505* (2010.01)
*H01M 10/052* (2010.01)

(52) U.S. Cl.
CPC ........... *H01M 4/485* (2013.01); *H01M 4/505* (2013.01); *H01M 4/525* (2013.01); *C01P 2002/72* (2013.01); *C01P 2002/74* (2013.01); *C01P 2006/40* (2013.01); *C01P 2006/80* (2013.01); *H01M 10/052* (2013.01)

(56) References Cited

FOREIGN PATENT DOCUMENTS

| | | |
|---|---|---|
| JP | 2009-032681 A | 2/2009 |
| JP | 2012-204281 | 10/2012 |

OTHER PUBLICATIONS

English Translation of Chinese Search Report dated Jan. 3, 2019 for the related Chinese Patent Application No. 201410777656.4.

\* cited by examiner

POSITIVE ELECTRODE ACTIVE MATERIAL FOR NON-AQUEOUS ELECTROLYTE SECONDARY BATTERIES AND NON-AQUEOUS ELECTROLYTE SECONDARY BATTERY

BACKGROUND

1. Technical Field

The present disclosure relates to a positive electrode active material for non-aqueous electrolyte secondary batteries, a non-aqueous electrolyte secondary battery, and a method for manufacturing positive electrode active materials for non-aqueous electrolyte secondary batteries.

2. Description of the Related Art

Lithium-rich composite oxides containing lithium in transition metal layers as well as in lithium layers are attractive high-capacity positive electrode materials because of having large amounts of lithium involved in charge/discharge. For example, Japanese Unexamined Patent Application Publication No. 2012-204281 discloses a lithium-rich composite oxide having an O2 structure (hereinafter, written as "O2 lithium-rich oxide").

Japanese Unexamined Patent Application Publication No. 2012-204281 describes that the use of the O2 lithium-rich oxide as a positive electrode active material for lithium secondary batteries enhances the discharge capacity of batteries. Lithium-rich composite oxides having an O3 structure (hereinafter, written as "O3 lithium-rich oxide") are also known.

However, the conventional techniques have problems such as insufficient capacity of positive electrode active materials due to the inhibition of the movement of lithium.

SUMMARY

One non-limiting and exemplary embodiment provides a positive electrode active material for non-aqueous electrolyte secondary batteries which enhances battery capacity.

In one general aspect, the techniques disclosed here feature a positive electrode active material for non-aqueous electrolyte secondary batteries that includes a $Li_2MnO_3$—$LiMO_2$ solid solution {M is at least one metal element} which shows two peaks in an X-ray diffraction pattern each having a peak top at a diffraction angle of 18° to 19° and satisfying $0.001 < R_{(B/A)} < 0.03$, the $R_{(B/A)}$ is the ratio of the intensity B of one of the peaks on the higher angle side to the intensity A of the other peak on the lower angle side.

With the positive electrode active material for non-aqueous electrolyte secondary batteries according to the present disclosure, it is possible to achieve a higher battery capacity than obtained with a positive electrode active material containing a conventional lithium-rich oxide.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION (Underlying Knowledge Forming Basis of the Present Disclosure)

In conventional techniques, the use of an O3 lithium-rich oxide as a positive electrode active material encounters a problem that transition metals are migrated during charge/discharge to inhibit the movement of lithium in alkali metal layers. This problem associated with migration is solved when an O2 lithium-rich oxide is used as a positive electrode active material. However, O2 lithium-rich oxides have a problem in that the paths from transition metal layers to alkali metal layers are narrow as compared to those in O3 structures, making the movement of lithium in the transition metal layers difficult. Consequently, the capacity obtained with positive electrode active materials using conventional lithium-rich oxides is not high as expected.

The present inventor addressed these problems and has found that battery capacity is specifically enhanced when a lithium-rich positive electrode active material includes a $Li_2MnO_3$—$LiMO_2$ solid solution (for example, as a main component) which shows two specific peaks in an X-ray diffraction pattern having an intensity ratio in a specific range.

In one general aspect, the techniques disclosed here feature a positive electrode active material for non-aqueous electrolyte secondary batteries that includes a $Li_2MnO_3$—$LiMO_2$ solid solution {M is at least one metal element} which shows two peaks in an X-ray diffraction pattern each having a peak top at a diffraction angle of 18° to 19° and satisfying $0.001 < R_{(B/A)} < 0.03$, the $R_{(B/A)}$ is the ratio of the intensity B of one of the peaks on the higher angle side to the intensity A of the other peak on the lower angle side.

Such a positive electrode active material realizes a higher battery capacity than obtained with a positive electrode active material containing a conventional lithium-rich oxide.

Hereinbelow, an exemplary embodiment of the present disclosure will be described.

An exemplary embodiment of the present disclosure resides in a non-aqueous electrolyte secondary battery including a positive electrode, a negative electrode and a non-aqueous electrolyte. A separator is, for example, disposed between the positive electrode and the negative electrode. For example, the non-aqueous electrolyte secondary battery may have a structure in which the positive electrode and the negative electrode are wound via a separator and the wound electrode assembly and the non-aqueous electrolyte are accommodated in a battery case. Instead of such a wound electrode assembly, other forms of electrode assemblies may be adopted such as a laminate-type electrode assembly in which the positive electrode and the negative electrode are stacked one on top of the other via a separator. The shapes of the non-aqueous electrolyte secondary batteries are not particularly limited, and examples thereof include cylindrical types, square types, coin types, button types and laminate types.

(Positive Electrodes)

For example, the positive electrode is composed of a positive electrode current collector such as a metal foil, and a positive electrode active material layer disposed on the positive electrode current collector. Examples of the positive electrode current collectors include foils of metals such as aluminum that are stable at positive electrode potentials, and films having such metals as surface layers. The positive electrode active material layer, for example, includes an electroconductive material and a binder in addition to a positive electrode active material.

The electroconductive material is used to enhance the electric conductivity of the positive electrode active material layer. Examples of the electroconductive materials include carbon materials such as carbon black, acetylene black, Ketjen black and graphite. These materials may be used singly, or two or more may be used in combination. The content ratio of the electroconductive material is, for example, 0.1 to 30 weight %, 0.1 to 20 weight %, and 0.1 to 10 weight % relative to the total mass of the positive electrode active material layer.

The binder is used to maintain a good contact between the positive electrode active material and the electroconductive material and also to increase the binding property of the components such as the positive electrode active material with respect to the surface of the positive electrode current collector. Examples of the binders include polytetrafluoroethylene (PTFE), polyvinylidene fluoride, polyvinyl acetate, polymethacrylate, polyacrylate, polyacrylonitrile, polyvinyl alcohol and mixtures of two or more of these compounds. The binder may be used in combination with a thickener such as carboxymethyl cellulose (CMC) or polyethylene oxide (PEO). These components may be used singly, or two or more may be used in combination. The content ratio of the binder may be, for example, 0.1 to 30 weight %, 0.1 to 20 weight %, and 0.1 to 10 weight % relative to the total mass of the positive electrode active material layer.

The charge cut-off voltage of the positive electrode (the positive electrode potential in a fully charged state) is not particularly limited, but is, for example, not less than 4.4 V (vs. Li/Li$^+$), not less than 4.5 V, and 4.5 V to 5.0 V. The non-aqueous electrolyte secondary batteries in the present embodiment are particularly suited for use in high-voltage applications in which the charge cut-off voltage is 4.4 V or more.

Hereinbelow, the positive electrode active material will be described.

The positive electrode active material includes a $Li_2MnO_3$—$LiMO_2$ solid solution {M is at least one metal element}. For example, the positive electrode active material may include such a solid solution as a main component. Here, the term "main component" means that its content is 50 vol % or more relative to the total volume of the positive electrode active material. The $Li_2MnO_3$—$LiMO_2$ solid solution is a lithium-rich lithium composite oxide containing lithium in transition metal layers as well as in lithium layers. In an X-ray diffraction pattern obtained by the X-ray diffractometry of the $Li_2MnO_3$—$LiMO_2$ solid solution, a peak assigned to a superlattice structure is observed at a diffraction angle (2θ) near 20° to 25° (near 2θ=21° in the X-ray diffraction pattern shown in FIG. 1).

The positive electrode active material may include other components such as metal compounds other than the $Li_2MnO_3$—$LiMO_2$ solid solution in the form of a mixture or a solid solution while still achieving the object of the present disclosure. For example, the content of $Li_2MnO_3$—$LiMO_2$ solid relative to the total volume of the positive electrode active material may be 50 vol % or more and 80 vol % or more. In the present embodiment, the positive electrode active material includes the $Li_2MnO_3$—$LiMO_2$ solid solution as the single component (100 vol %).

In the $Li_2MnO_3$—$LiMO_2$ solid solution (the positive electrode active material), M is at least one selected from, for example, nickel, cobalt, iron, aluminum, magnesium, titanium, tin, zirconium, niobium, molybdenum, tungsten, bismuth, chromium, vanadium, cerium, potassium, gallium and indium. The transition metals in the $Li_2MnO_3$—$LiMO_2$ solid solution, for example, include manganese, and at least one of nickel and cobalt or both nickel and cobalt.

For example, $Li_2MnO_3$—$LiMO_2$ solid solution is represented by the general formula: $Li_xNa_y[Li_{z1}Mn_{z2}M^*_{(1-z1-z2)}]O_{(2\pm\gamma)}$ {0.67<x<1.1, 0<y<0.1, 0<z1<0.33, 0.5<z2<0.95, 0≤γ<0.1, and M* indicates two or more metal elements including at least nickel and cobalt}.

An increase in capacity may be obtained by controlling x in the above general formula to be larger than 0.67. From viewpoints such as the reduction of the residual amount of alkali on the surface of the positive electrode active material, x is, for example, less than 1.1, and 0.83<x<1.1. The letter z1 is larger than 0, namely, the transition metal layers contain lithium. In consideration of the stability of the crystal structures at high potential, for example, z1 is less than 0.33.

As shown in the above general formula, the $Li_2MnO_3$—$LiMO_2$ solid solution, for example, contains a small amount of sodium. Specifically, y in the above general formula is, for example, 0.0001 to less than 0.1. For example, this configuration increases the interlayer spacings through which lithium may be moved, and thereby enhances charge/discharge characteristics while maintaining high capacity.

Figure 1:
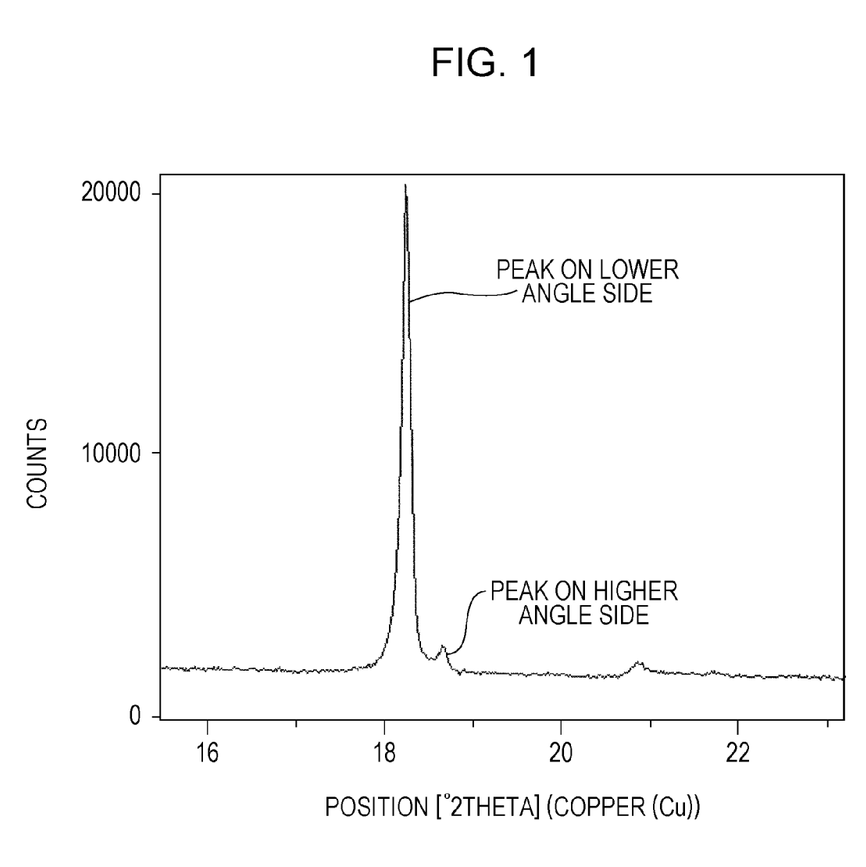
FIG. 1 is an X-ray diffraction pattern of a positive electrode active material in an embodiment of the present disclosure.

FIG. 1 illustrates an X-ray diffraction pattern of the $Li_2MnO_3$—$LiMO_2$ solid solution (the positive electrode active material).

As illustrated in FIG. 1, an X-ray diffraction pattern obtained by the X-ray diffractometry of the $Li_2MnO_3$—$LiMO_2$ solid solution shows two peaks each having a peak top at 2θ=18° to 19°. That is, the positive electrode active material includes the $Li_2MnO_3$—$LiMO_2$ solid solution as the main component (100 vol % in the present embodiment) which gives rise to two peaks each having a peak top at 2θ=18° to 19° in an X-ray diffraction pattern.

Further, the $Li_2MnO_3$—$LiMO_2$ solid solution that is the main component of the positive electrode active material is such that the above two peaks satisfy $0.001<R_{(B/A)}<0.03$ wherein $R_{(B/A)}$ is the ratio of the intensity B of one of the peaks on the higher angle side to the intensity A of the other peak on the lower angle side. As will be described later in Examples, discharge capacity may be specifically enhanced when the positive electrode active material contains the $Li_2MnO_3$—$LiMO_2$ solid solution having a peak intensity ratio $R_{(B/A)}$ in the above range.

The presence of the two peaks at 2θ=18° to 19° in an X-ray diffraction pattern indicates that the $Li_2MnO_3$—$LiMO_2$ solid solution has two different crystal structures. The intensity A of the peak on the lower angle side is significantly higher than the intensity B of the peak on the higher angle side. This means that the peak on the lower angle side is assigned to the main crystal structure in the $Li_2MnO_3$—$LiMO_2$ solid solution. That is, the $Li_2MnO_3$—$LiMO_2$ solid solution contains the main crystal structure and a small proportion of a crystal structure that is different from the main crystal structure.

The peak on the lower angle side is ascribed to an O2 structure, a T2 structure, an O6 structure or a mixture of these structures. That is, the main crystal structure of the $Li_2MnO_3$—$LiMO_2$ solid solution is an O2 structure, a T2 structure, an O6 structure or a mixture of these structures. For example, the main crystal structure of the $Li_2MnO_3$—$LiMO_2$ solid solution may be an O2 structure. The $Li_2MnO_3$—$LiMO_2$ solid solution may be composed of an O2 structure alone, or may also include an oxide with a T2 structure or an O6 structure synthesized as a byproduct during the synthesis of the solid solution having an O2 structure.

Here, the O2 structure belongs to the space group P63mc and is such that lithium is present at the center of an oxygen octahedron and the oxygen atoms and the transition metal atoms stack in two different ways per unit lattice. The O6 structure belongs to the space group R-3m and is such that lithium is present at the center of an oxygen octahedron and the oxygen atoms and the transition metal atoms stack in six different ways per unit lattice. The T2 structure belongs to the space group Cmca and is such that lithium is present at the center of an oxygen tetrahedron and the oxygen atoms and the transition metal atoms stack in two different ways per unit lattice.

The peak on the higher angle side is ascribed to a cubic close packing of oxygen atoms (hereinafter, written as "ccp structure"). Specifically, this peak is assigned to an O3 structure belonging to the space group R-3m or C2/m, a spinel structure belonging to the space group Fd3m or a mixture of these structures. That is, the minor crystal structure in the $Li_2MnO_3$—$LiMO_2$ solid solution is a ccp structure, for example, an O3 structure. The O3 structure belongs to the space group R-3m and is such that lithium is present at the center of an oxygen octahedron and the oxygen atoms and the transition metal atoms stack in three different ways per unit lattice.

The $Li_2MnO_3$—$LiMO_2$ solid solution may be prepared by synthesizing a sodium composite oxide and ion-exchanging the composite oxide to exchange the sodium ions with lithium ions.

Sodium composite oxides may be synthesized by the following method.

A sodium composite oxide is a composite oxide containing sodium in a higher content than lithium, and may be synthesized by, for example, mixing a sodium compound, a lithium compound and transition metal compounds and calcining the mixture. Examples of the sodium compounds include $Na_2O$, $Na_2O_2$, $Na_2CO_3$, $NaNO_3$ and $NaOH$. Examples of the lithium compounds include $Li_2O$, $Li_2CO_3$, $LiNO_3$, $LiNO_2$, $LiOH$, $LiOH.H_2O$, $LiH$ and $LiF$. Examples of the transition metal compounds include Mn-containing compounds, namely, manganese compounds, and compounds containing other transition metals (for example, nickel compounds and cobalt compounds). Examples of the manganese compounds include $Mn_3O_4$, $Mn_2O_3$, $MnO_2$, $MnCO_3$, $MnSO_4$ and $Mn(OH)_2$.

The sodium compound, the lithium compound, the manganese compound and the additional transition metal compound (such as a nickel compound or a cobalt compound) may be mixed together in a mixing ratio that is determined such that the obtainable sodium composite oxide will have a ratio $R_{(b/a)}$ of peak intensities in an X-ray diffraction pattern described later in a specific range. Specifically, the lithium compound is added in slight excess as compared to the preparation of an O2 lithium-rich oxide. If the amount of the lithium compound is excessively large, the peak intensity ratio $R_{(b/a)}$ exceeds the specific range and the desired sodium composite oxide cannot be obtained. Thus, strict control is essential in determining the amount in which the lithium compound is added. The mixing method is not particularly limited as long as the compounds may be mixed into a uniform mixture, and examples thereof include methods using known devices such as mixers.

The mixture may be calcined in air or in a stream of oxygen. The calcination temperature is, for example, 600 to 1100° C. and 700 to 1000° C. Provided that the calcination temperature is 600 to 1100° C., the calcination time is, for example, 1 to 50 hours. The calcined material is, for example, crushed by a known method.

Figure 2:
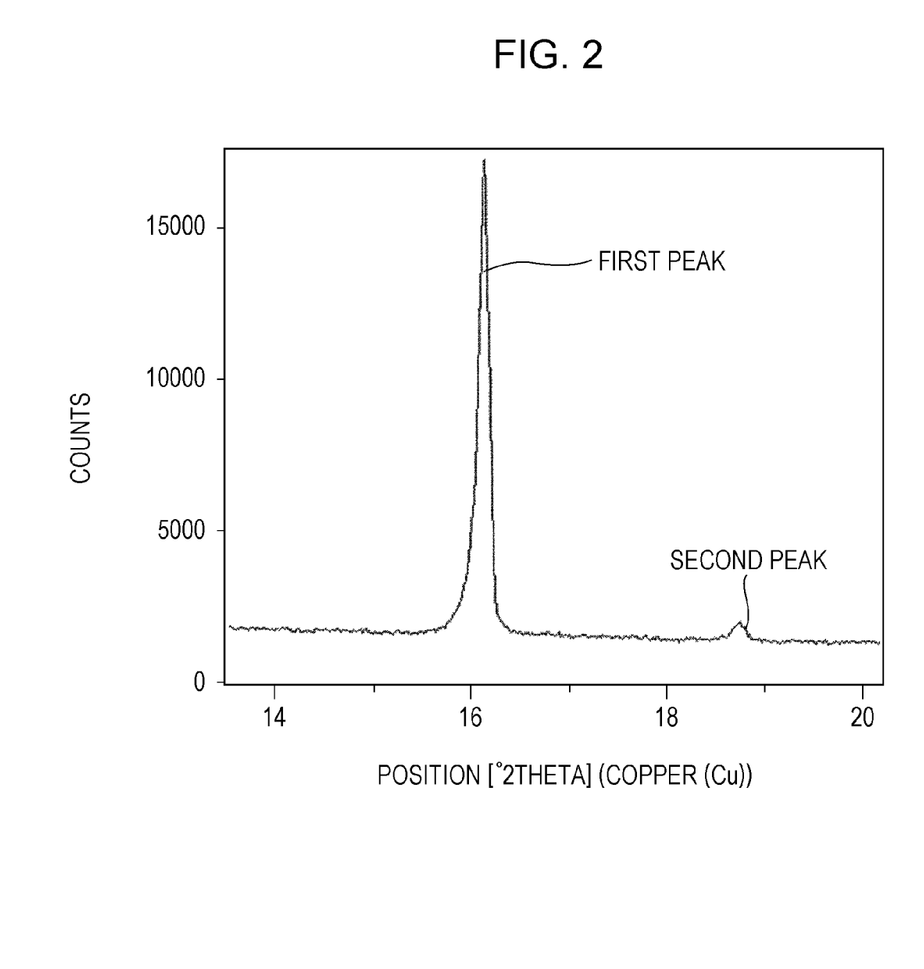
FIG. 2 is an X-ray diffraction pattern of a sodium composite oxide used in the preparation of a positive electrode active material in an embodiment of the present disclosure.

FIG. 2 is an X-ray diffraction pattern of a sodium composite oxide obtained by such a method.

As illustrated in FIG. 2, an X-ray diffraction pattern obtained by the X-ray diffractometry of the sodium composite oxide includes a first peak having a peak top at 2θ=16° to 17° and a second peak having a peak top at 2θ=18° to 19°. That is, the $Li_2MnO_3$—$LiMO_2$ solid solution that is the main component of the positive electrode active material is prepared from a sodium composite oxide having such first and second peaks in an X-ray diffraction pattern.

Further, the sodium composite oxide is such that the ratio $R_{(b/a)}$ of the intensity b of the second peak to the intensity a of the first peak satisfies $0.001<R_{(b/a)}<0.028$. The presence of the first peak and the second peak indicates that the sodium composite oxide has two different crystal structures. The $Li_2MnO_3$—$LiMO_2$ solid solution may be prepared by ion exchange of the sodium composite oxide.

The sodium composite oxide is, for example, represented by the general formula: $Na_\alpha[Li_{\beta1}Mn_{\beta2}M_{(1-\beta1-\beta2)}]O_{(2\pm\gamma)}$ {$0.67<\alpha<1.1$, $0<\beta1<0.33$, $0.5<\beta2<0.95$, $0\leq\gamma<0.1$, and M is at least one metal element}. For example, the metal element M is at least one selected from nickel, cobalt, iron, aluminum, magnesium, titanium, tin, zirconium, niobium, molybdenum, tungsten, bismuth, chromium, vanadium, cerium, potassium, gallium and indium. The transition metals in the sodium composite oxide, for example, include manganese, and at least one of nickel and cobalt or both nickel and cobalt.

The ion exchange may be performed by the following method.

To exchange the sodium ions with lithium ions, the sodium composite oxide may be suitably heated in the presence of a molten lithium salt. The lithium salt is, for example, at least one selected from such lithium salts as $LiNO_3$, $LiNO_2$, $Li_2SO_4$, $LiCl$, $Li_2CO_3$, $LiOH$, $LiI$ and $LiBr$. The heating temperature in the ion exchange treatment is for example, 180 to 380° C., and 230 to 330° C.

Another suited method for the ion exchange treatment is to soak the sodium composite oxide in a solution containing at least one lithium salt. In this case, the sodium composite oxide is added to a solution of a lithium compound in a solvent, and the mixture is heat treated. To increase the ion exchange rate, the ion exchange treatment is for example, performed at near the boiling point of the solvent while refluxing the solvent or under an increased pressure to suppress the boiling of the solvent. The treatment temperature is for example, 80 to 200° C., and 100 to 180° C.

Through the steps described above, the $Li_2MnO_3$—$LiMO_2$ solid solution having a ratio $R_{(B/A)}$ of peak intensities in an X-ray diffraction pattern in the specific range ($0.001 < R_{(B/A)} < 0.03$) may be obtained.

(Negative Electrodes)

For example, the negative electrode includes a negative electrode current collector such as a metal foil, and a negative electrode active material layer disposed on the negative electrode current collector. Examples of the negative electrode current collectors include foils of metals such as aluminum and copper that are stable at negative electrode potentials, and films having such metals as surface layers. The negative electrode active material layer includes a negative electrode active material capable of insertion and release of lithium ions, and for example, further includes a binder. The negative electrode active material layer may include an electroconductive material as required.

Examples of the negative electrode active materials include natural graphite, artificial graphite, lithium, silicon, carbon, tin, germanium, aluminum, lead, indium, gallium, lithium alloys, lithium-inserted carbon and silicon, and alloys and mixtures of these materials. The binder may be any of the binders such as PTFE mentioned with respect to the positive electrode, but another binder such as styrene-butadiene copolymer (SBR) or a modified substance thereof may be used. The binder may be used in combination with a thickener such as CMC.

(Non-Aqueous Electrolytes)

The non-aqueous electrolyte includes a non-aqueous solvent and an electrolyte salt dissolved in the non-aqueous solvent. The non-aqueous electrolytes are not limited to liquid electrolytes (non-aqueous electrolytic solutions), and may be solid electrolytes such as gelled polymer electrolytes. Examples of the non-aqueous solvents include esters, ethers, nitriles such as acetonitrile, amides such as dimethylformamide, and mixed solvents containing two or more of these solvents.

Examples of the esters include cyclic ester carbonates such as ethylene carbonate, propylene carbonate and butylene carbonate, chain ester carbonates such as dimethyl carbonate, methylethyl carbonate, diethyl carbonate, methylpropyl carbonate, ethylpropyl carbonate and methylisopropyl carbonate, and carboxylic acid esters such as methyl acetate, ethyl acetate, propyl acetate, methyl propionate, ethyl propionate and γ-butyrolactone.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol and crown ethers, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether and tetraethylene glycol dimethyl ether.

The non-aqueous solvent, for example, includes a halogen substituted compound resulting from the substitution of hydrogen atoms in the above solvent with halogen atoms such as fluorine atoms. The non-aqueous solvent, for example, includes, a fluorinated cyclic ester carbonate or a fluorinated chain ester carbonate or both are used as a mixture. With this configuration, good protective films are formed on the negative electrode and also on the positive electrode, resulting in an enhancement in cycle characteristics. The fluorinated cyclic ester carbonates is, for example, 4-fluoroethylene carbonate, 4,5-difluoroethylene carbonate, 4,4-difluoroethylene carbonate, 4,4,5-trifluoroethylene carbonate and 4,4,5,5-tetrafluoroethylene carbonate. The fluorinated chain esters is, for example, ethyl 2,2,2-trifluoroacetate, methyl 3,3,3-trifluoropropionate and methyl pentafluoropropionate.

The electrolyte salt is, for example, a lithium salt. Examples of the lithium salts include $LiPF_6$, $LiBF_4$, $LiAsF_6$, $LiClO_4$, $LiCF_3SO_3$, $LiN(FSO_2)_2$, $LiN(C_lF_{2l+1}SO_2)(C_mF_{2m+1}SO_2)$ (l and m are integers of 1 or greater), $LiC(C_pF_{2p+1}SO_2)(C_qF_{2q+1}SO_2)(C_rF_{2r+1}SO_2)$ (p, q and r are integers of 1 or greater), $Li[B(C_2O_4)_2]$ (lithium bis(oxalato)borate (LiBOB)), $Li[B(C_2O_4)F_2]$, $Li[P(C_2O_4)F_4]$ and $Li[P(C_2O_4)_2F_2]$. The lithium salts may be used singly, or two or more may be used in combination.

(Separators)

The separator may be a porous sheet having ion permeability and insulating properties. Specific examples of the porous sheets include microporous thin films, woven fabrics and non-woven fabrics. Examples of suitable separator materials include olefin resins such as polyethylene and polypropylene, and celluloses. The separator may be a laminate having a cellulose fiber layer and a thermoplastic resin fiber layer such as an olefin resin layer.

EXAMPLES

Hereinbelow, the present disclosure will be described in further detail based on Examples without limiting the scope of the present disclosure to such Examples.

Example 1

(Preparation of $Li_2MnO_3$—$LiMO_2$ Solid Solution (Positive Electrode Active Material))

$NiSO_4$, $CoSO_4$ and $MnSO_4$ were mixed together and coprecipitated in an aqueous solution with a stoichiometric ratio of 13.5:13.5:73 to give $(Ni,Co,Mn)(OH)_2$ as a precursor material. The precursor material, $Na_2CO_3$ and $LiOH.H_2O$ were mixed together with a stoichiometric ratio of 85:74:15. After additional $LiOH.H_2O$ was admixed, the resultant mixture was held at 900° C. for 10 hours, thereby synthesizing a sodium composite oxide. The amount of additional $LiOH.H_2O$ was controlled such that the ratio $R_{(b/a)}$ of peak intensities in an X-ray diffraction pattern of the sodium composite oxide would be 0.0035.

The composition of the sodium composite oxide was analyzed with an inductively coupled plasma (ICP) spectrometer (product name "iCAP6300" manufactured by Thermo Fisher Scientific). As a result, Na:Li:Mn:Co:Ni=0.756:0.145:0.625:0.115:0.115.

The peak intensity ratio $R_{(b/a)}$ of the sodium composite oxide was determined using a powder X-ray diffractometer (product name "RINT2200" manufactured by Rigaku Corporation). As a result, the X-ray diffraction pattern of the sodium composite oxide showed a first peak having a peak top at $2\theta = 16°$ to $17°$ and a second peak having a peak top at $2\theta = 18°$ to $19°$, with the peak intensity ratio $R_{(b/a)}$ being 0.0036.

To 5 g of the sodium composite oxide, a molten salt including lithium nitrate and lithium chloride in a molar ratio of 88:12 was added in a 5-fold equivalent weight (25 g). Thereafter, the mixture was held at 280° C. for 2 hours and thereby the sodium ions in the sodium composite oxide were exchanged with lithium ions. Thus, a lithium-rich lithium composite oxide ($Li_2MnO_3$—$LiMO_2$ solid solution) was prepared.

The composition of the lithium composite oxide was analyzed with the ICP spectrometer. As a result, Na:Li:Mn:Co:Ni=0.0005:0.889:0.625:0.115:0.115.

The peak intensity ratio $R_{(B/A)}$ of the lithium composite oxide was determined using the powder X-ray diffractometer. As a result, the X-ray diffraction pattern of the lithium composite oxide showed two peaks each having a peak top at 2θ=18° to 19°, with the peak intensity ratio $R_{(B/A)}$ being 0.007. An analysis of crystal structures showed that the oxide included an O2 structure belonging to the space group P63mc as the main crystal structure, and 0.4% of a ccp structure (calculated based on the peak intensity ratio $R_{(B/A)}$). Further, Rietveld analysis confirmed that the lithium composite oxide was a $Li_2MnO_3$—$LiMO_2$ solid solution represented by $Li_{0.744}Na_{0.0005}[Li_{0.145}Mn_{0.625}Co_{0.115}Ni_{0.115}]O_2$.

(Preparation of Electrolytic Solution)

A non-aqueous solvent was obtained by mixing 4-fluoroethylene carbonate (FEC) and fluoroethylmethyl carbonate (FEMC) in a volume ratio of 1:3. $LiPF_6$ as an electrolyte salt was dissolved in the non-aqueous solvent with a concentration of 1.0 mol/L. An electrolytic solution was thus prepared.

(Fabrication of Coin-Type Non-Aqueous Electrolyte Secondary Battery)

Figure 3:
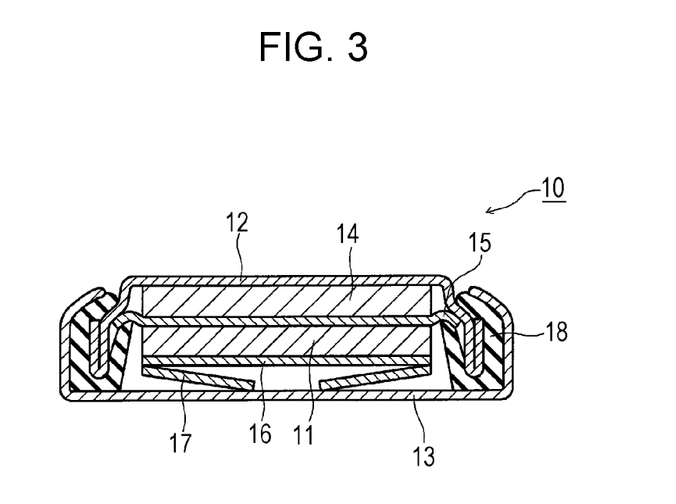
FIG. 3 is a schematic view illustrating a non-aqueous electrolyte secondary battery fabricated in Examples and Comparative Examples.

A coin-type non-aqueous electrolyte secondary battery 10 illustrated in FIG. 3 (hereinafter, written as "coin-type battery 10") was fabricated in the following manner. First, the $Li_2MnO_3$—$LiMO_2$ solid solution as a positive electrode active material, acetylene black as a conductive agent, and polyvinylidene fluoride as a binder were mixed with a positive electrode active material:conductive agent:binder mass ratio of 80:10:10. Next, the mixture was slurried with N-methyl-2-pyrrolidone. The slurry was applied onto an aluminum foil current collector as a positive electrode current collector, and was dried at 110° C. in vacuum. A positive electrode 11 was thus formed.

Next, a battery exterior body was provided which had a sealing plate 12 and a case 13. In dry air having a dew point of −50° C. or below, a 0.3 mm thick lithium metal foil as a negative electrode 14 was attached to the inner surface of the sealing plate 12. A separator 15 was arranged on the negative electrode 14, and thereafter the positive electrode 11 was arranged such that the positive electrode active material layer would be opposed to the separator 15. Further, a stainless steel cover plate 16 and a disc spring 17 were arranged on the side of the positive electrode 11 opposite to the separator 15. The recess in the sealing plate 12 was filled with the electrolytic solution, and a gasket 18 and the case 13 were attached to the sealing plate 12. Thus, the coin-type battery 10 was fabricated.

Table describes the peak intensity ratio $R_{(b/a)}$ of the sodium composite oxide, the peak intensity ratio $R_{(B/A)}$ of the $Li_2MnO_3$—$LiMO_2$ solid solution, the content of the ccp structure in the $Li_2MnO_3$—$LiMO_2$ solid solution, and the discharge capacity described later. (The same applies to the following Examples and Comparative Examples.)

Examples 2 to 5

Coin-type batteries were fabricated in the same manner as in Example 1, except that the amount of additional $LiOH.H_2O$ was controlled such that a target value of the ratio $R_{(b/a)}$ of peak intensities in an X-ray diffraction pattern of the sodium composite oxide would be obtained. The values of the peak intensity ratio $R_{(b/a)}$ described in Table are the analytical results obtained by the powder X-ray diffractometry, and the target values were approximate to these values. (The same applies hereinafter.)

The X-ray diffraction patterns of the lithium composite oxides of Examples 2 to 5 analyzed on the powder X-ray diffractometer showed that the peak intensity ratios $R_{(B/A)}$ were values described in Table.

The lithium composite oxides obtained were $Li_2MnO_3$—$LiMO_2$ solid solutions having the same composition as in Example 1.

Examples 6 to 11

$NiSO_4$, $CoSO_4$ and $MnSO_4$ were mixed together and coprecipitated in an aqueous solution with a stoichiometric ratio of 6.5:13.5:80 to give $(Ni,Co,Mn)(OH)_2$ as a precursor material. The precursor material, $Na_2CO_3$ and $LiOH.H_2O$ were mixed together with a stoichiometric ratio of 85:74:15. After additional $LiOH.H_2O$ was admixed, the resultant mixture was held at 900° C. for 10 hours, thereby synthesizing a sodium composite oxide. During this process, the amount of additional $LiOH.H_2O$ was controlled such that a target value (a value described in Table) of the ratio $R_{(b/a)}$ of peak intensities in an X-ray diffraction pattern of the sodium composite oxide would be obtained.

Except for the above step, coin-type batteries were fabricated in the same manner as in Example 1.

The compositions of the lithium composite oxides obtained in Examples 6 to 11 were analyzed with the ICP spectrometer. As a result, Na:Li:Mn:Co:Ni=0.0004:0.932:0.666:0.112:0.054 for each of the oxides.

The X-ray diffraction patterns of the lithium composite oxides of Examples 6 to 11 analyzed on the powder X-ray diffractometer showed that the peak intensity ratios $R_{(B/A)}$ were values described in Table.

Further, Rietveld analysis confirmed that the lithium composite oxides were each a $Li_2MnO_3$—$LiMO_2$ solid solution represented by $Li_{0.765}Na_{0.0004}[Li_{0.167}Mn_{0.666}Co_{0.112}Ni_{0.054}]O_2$.

Examples 12 to 16

$NiSO_4$, $CoSO_4$ and $MnSO_4$ were mixed together and coprecipitated in an aqueous solution with a stoichiometric ratio of 13.5:6.5:80 to give $(Ni,Co,Mn)(OH)_2$ as a precursor material. The precursor material, $Na_2CO_3$ and $LiOH.H_2O$ were mixed together with a stoichiometric ratio of 85:74:15. After additional $LiOH.H_2O$ was admixed, the resultant mixture was held at 900° C. for 10 hours, thereby synthesizing a sodium composite oxide. During this process, the amount of additional $LiOH.H_2O$ was controlled such that a target value (a value described in Table) of the ratio $R_{(b/a)}$ of peak intensities in an X-ray diffraction pattern of the sodium composite oxide would be obtained.

Except for the above step, coin-type batteries were fabricated in the same manner as in Example 1.

The compositions of the lithium composite oxides obtained in Examples 12 to 16 were analyzed with the ICP spectrometer. As a result, Na:Li:Mn:Co:Ni=0.0004:0.896:0.684:0.056:0.115 for each of the oxides.

The X-ray diffraction patterns of the lithium composite oxides of Examples 12 to 16 analyzed on the powder X-ray diffractometer showed that the peak intensity ratios $R_{(B/A)}$ were values described in Table. Further, Rietveld analysis confirmed that the lithium composite oxides were each a Li$_2$MnO$_3$—LiMO$_2$ solid solution represented by Li$_{0.751}$Na$_{0.0004}$[Li$_{0.145}$Mn$_{0.684}$Co$_{0.056}$Ni$_{0.115}$]O$_2$.

Comparative Example 1

A coin-type battery was fabricated in the same manner as in Example 1, except that no additional LiOH.H$_2$O was added during the synthesis of the sodium composite oxide.

The X-ray diffraction pattern of the lithium composite oxide analyzed on the powder X-ray diffractometer showed no peak on the higher angle side. (The peak intensity ratio R$_{(B/A)}$ was 0.)

The lithium composite oxide was a Li$_2$MnO$_3$—LiMO$_2$ solid solution having the same composition as in Example 1.

Comparative Example 2

A coin-type battery was fabricated in the same manner as in Example 12, except that no additional LiOH.H$_2$O was added during the synthesis of the sodium composite oxide.

The X-ray diffraction pattern of the lithium composite oxide analyzed on the powder X-ray diffractometer showed no peak on the higher angle side. (The peak intensity ratio R$_{(B/A)}$ was 0.)

The lithium composite oxide was a Li$_2$MnO$_3$—LiMO$_2$ solid solution having the same composition as in Example 12.

Comparative Examples 3 and 4

Coin-type batteries were fabricated in the same manner as in Example 1, except that the amount of additional LiOH.H$_2$O was controlled such that a target value (a value described in Table) of the ratio R$_{(b/a)}$ of peak intensities in an X-ray diffraction pattern of the sodium composite oxide would be obtained.

The X-ray diffraction patterns of the lithium composite oxides of Comparative Examples 3 and 4 analyzed on the powder X-ray diffractometer showed that the peak intensity ratios R$_{(B/A)}$ were values described in Table.

The lithium composite oxides obtained were Li$_2$MnO$_3$—LiMO$_2$ solid solutions having the same composition as in Example 1.

Comparative Example 5

A coin-type battery was fabricated in the same manner as in Example 6, except that the amount of additional LiOH.H$_2$O was controlled such that a target value (a value described in Table) of the ratio R$_{(b/a)}$ of peak intensities in an X-ray diffraction pattern of the sodium composite oxide would be obtained.

The X-ray diffraction pattern of the lithium composite oxide analyzed on the powder X-ray diffractometer showed that the peak intensity ratio R$_{(B/A)}$ was a value described in Table.

The lithium composite oxide obtained was a Li$_2$MnO$_3$—LiMO$_2$ solid solution having the same composition as in Example 6.

(Evaluation of Discharge Capacity)

The coin-type batteries fabricated in Examples and Comparative Examples were charged at a constant current of 15 mA/g until the battery voltage reached 4.7 V and were thereafter discharged at a constant current of 15 mA/g until the battery voltage reached 2.0 V, and the discharge capacities of the batteries were measured. The charge/discharge test involved an electrochemical measurement system manufactured by Solartron. The evaluation results are described in Table.

TABLE

|  | Composition* | R$_{(b/a)}$ | R$_{(B/A)}$ | Content of ccp structure vol % | Discharge capacity mAh/g |
|---|---|---|---|---|---|
| Ex. 1 | M1 | 0.0036 | 0.0070 | 0.4 | 261.6 |
| Ex. 2 | M1 | 0.0101 | 0.0123 | 0.7 | 264.2 |
| Ex. 3 | M1 | 0.0081 | 0.0144 | 0.8 | 263.7 |
| Ex. 4 | M1 | 0.0193 | 0.0167 | 1.2 | 262.1 |
| Ex. 5 | M1 | 0.0251 | 0.0231 | 1.7 | 260.7 |
| Ex. 6 | M2 | 0.0036 | 0.0041 | 0.1 | 257.1 |
| Ex. 7 | M2 | 0.0067 | 0.0108 | 0.4 | 271.4 |
| Ex. 8 | M2 | 0.0156 | 0.0150 | 0.8 | 260.4 |
| Ex. 9 | M2 | 0.0099 | 0.0154 | 0.8 | 260.3 |
| Ex. 10 | M2 | 0.0135 | 0.0221 | 1.1 | 260.0 |
| Ex. 11 | M2 | 0.0196 | 0.0280 | 1.5 | 255.9 |
| Ex. 12 | M3 | 0.0015 | 0.0018 | 0.2 | 257.5 |
| Ex. 13 | M3 | 0.0027 | 0.0071 | 0.3 | 263.0 |
| Ex. 14 | M3 | 0.0034 | 0.0130 | 0.5 | 264.6 |
| Ex. 15 | M3 | 0.0091 | 0.0157 | 0.9 | 267.6 |
| Ex. 16 | M3 | 0.0183 | 0.0188 | 1.1 | 269.3 |
| Comp. Ex. 1 | M1 | 0 | 0 | 0 | 254.2 |
| Comp. Ex. 2 | M3 | 0 | 0 | 0 | 253.2 |
| Comp. Ex. 3 | M1 | 0.0295 | 0.0340 | 2.0 | 237.6 |
| Comp. Ex. 4 | M1 | 0.0546 | 0.0694 | 3.8 | 233.4 |
| Comp. Ex. 5 | M2 | 0.0373 | 0.0475 | 2.5 | 238.3 |

*Compositions of transition metals contained in positive electrode active materials
M1 Mn:Ni:Co = 73:13.5:13.5
M2 Mn:Ni:Co = 80:6.5:13.5
M3 Mn:Ni:Co = 80:13.5:6.5

Figure 4:
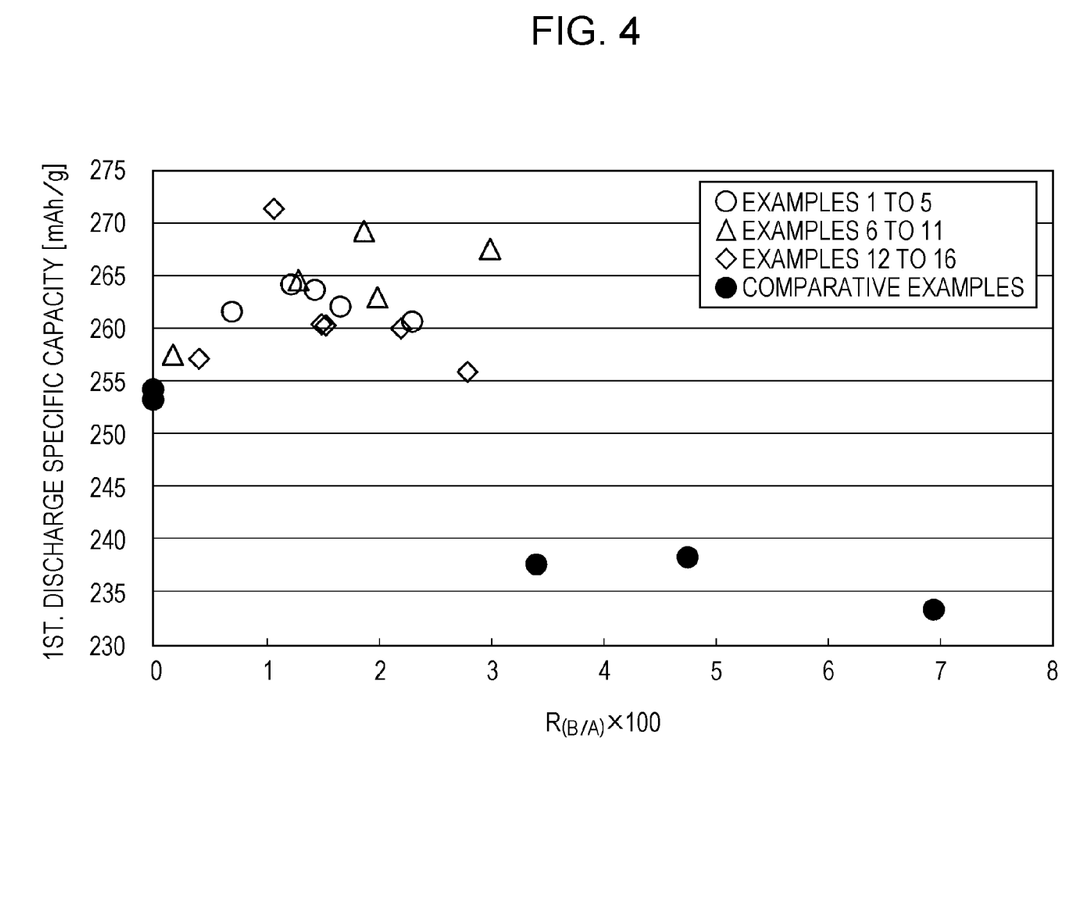
FIG. 4 is a diagram illustrating relationships between the ratio $R_{(B/A)}$ of peak intensities in an X-ray diffraction pattern of a positive electrode active material and the discharge capacity obtained with respect to non-aqueous electrolyte secondary batteries fabricated in Examples and Comparative Examples.
Figure 5:
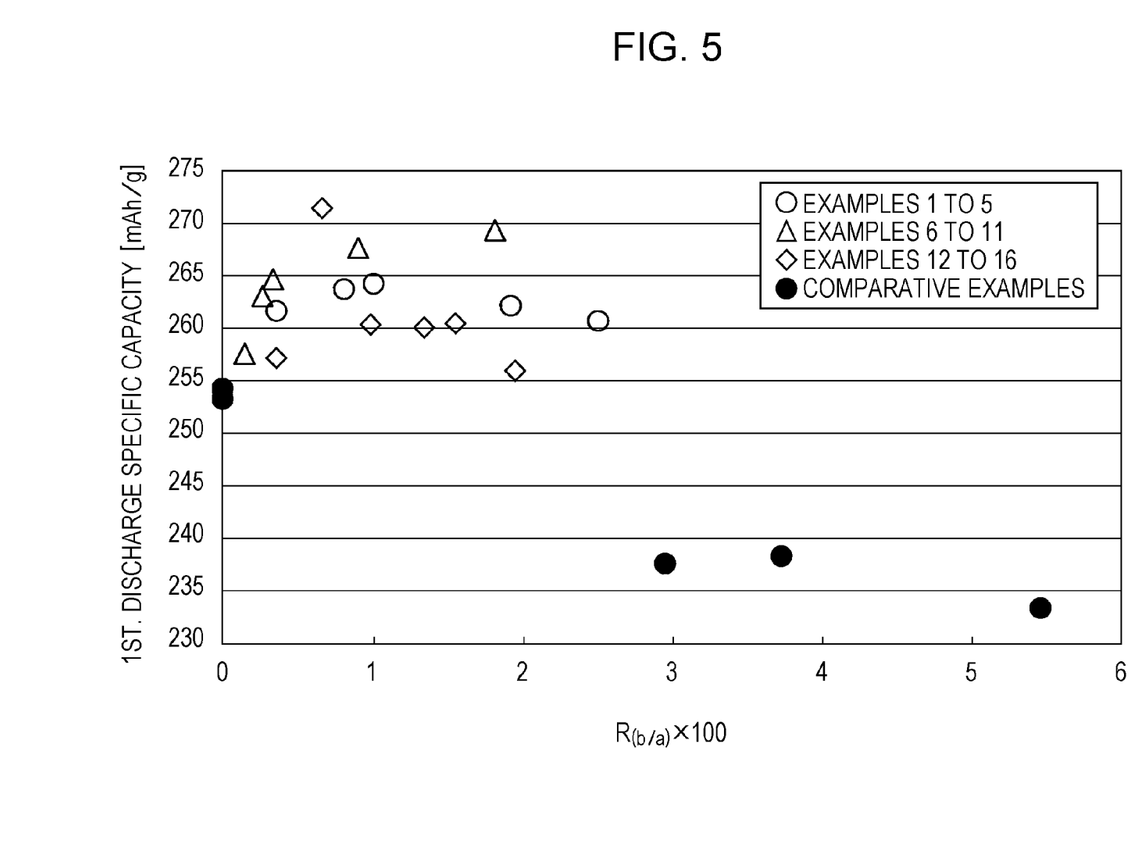
FIG. 5 is a diagram illustrating relationships between the ratio $R_{(b/a)}$ of peak intensities in an X-ray diffraction pattern of a sodium composite oxide used in the preparation of a positive electrode active material and the discharge capacity obtained with respect to non-aqueous electrolyte secondary batteries fabricated in Examples and Comparative Examples.

FIGS. 4 and 5 were prepared based on the data described in Table.

FIG. 4 is a diagram illustrating relationships between R$_{(B/A)}$×100 and discharge capacity obtained based on the ratio R$_{(B/A)}$ of peak intensities in the X-ray diffraction pattern of the positive electrode active material with respect to the coin-type batteries fabricated in Examples and Comparative Examples. FIG. 5 is a diagram illustrating relationships between $R_{(b/a)} \times 100$ and discharge capacity obtained based on the ratio $R_{(b/a)}$ of peak intensities in the X-ray diffraction pattern of the sodium composite oxide used in the preparation of the positive electrode active material.

As apparent from FIG. 4, the coin-type batteries of Examples in which the peak intensity ratio $R_{(B/A)}$ satisfied $0.001 < R_{(B/A)} < 0.03$ ($0.1 < R_{(B/A)} \times 100 < 3$) achieved a specific enhancement in discharge capacity compared to the coin-type batteries of Comparative Examples which failed to satisfy this condition. Namely, the satisfaction of the above condition provided a higher discharge capacity than when the peak intensity ratio $R_{(B/A)}$ was less than 0.001 (Comparative Examples 1 and 2) or when the peak intensity ratio $R_{(B/A)}$ exceeded 0.03 (Comparative Examples 3 and 4). In particular, a very low discharge capacity resulted when the peak intensity ratio $R_{(B/A)}$ was greater than 0.03.

As mentioned hereinabove, the peak on the lower angle side (the intensity A) is assigned to, for example, an O2 structure, and the peak on the higher angle side (the intensity B) to, for example, a ccp structure such as an O3 structure. Thus, discharge capacity may be specifically enhanced when the positive electrode active material contains an O2 structure as the main crystal structure and a slight amount of a ccp structure. This specific effect is obtained probably because the O2 structure as the main crystal structure suppresses the migration of transition metals and the presence of a slight amount of the ccp structure facilitates the movement of lithium in the transition metal layers. That is, high discharge capacity may be obtained by purposefully introducing a slight amount of a ccp structure to the crystal structures of the positive electrode active material, in contrast to forming the positive electrode active material from a pure O2 structure. On the other hand, the introduction of the ccp structure in a content exceeding 1.9 vol % results in a decrease in discharge capacity. That is, the specific enhancement in discharge capacity may be obtained only when the content of the ccp structure is in the very limited range of 0.03 to 1.9 vol % (or 0.05 to 1.8 vol %).

As illustrated in FIG. 5, the coin-type batteries which involved the sodium composite oxide satisfying the peak intensity ratio $R_{(b/a)}$ of $0.001 < R_{(b/a)} < 0.028$ ($0.1 < R_{(b/a)} \times 100 < 2.8$) achieved a specific enhancement in discharge capacity over the coin-type batteries of Comparative Examples that involved the sodium composite oxide which failed to satisfy such a condition.

What is claimed is:

1. A positive electrode active material for non-aqueous electrolyte secondary batteries, comprising a $Li_2MnO_3$—$LiMO_2$ solid solution, wherein the $Li_2MnO_3$—$LiMO_2$ solid solution is represented by the general formula: $Li_xNa_y[Li_{z1}Mn_{z2}M^*_{(1-z1-z2)}]O_{(2\pm\gamma)}$ $\{0.67<x<1.1, 0<y<0.1, 0<z1<0.33, 0.5<z2<0.95, 0\leq\gamma<0.1$, and M* indicates two or more transition metal elements including at least nickel and cobalt}, the solid solution showing two peaks in an X-ray diffraction pattern each having a peak top at a diffraction angle of 18° to 19° and satisfying $0.007 < R_{(B/A)} < 0.0231$, the $R_{(B/A)}$ is the ratio of the intensity B of one of the peaks on the higher angle side to the intensity A of the other peak on the lower angle side.

2. The positive electrode active material for non-aqueous electrolyte secondary batteries according to claim 1, wherein the positive electrode active material is in a volume ratio of 50 vol % or more relative to the total volume of the positive electrode active material.

3. A non-aqueous electrolyte secondary battery comprising:
    a positive electrode including the positive electrode active material;
    a negative electrode; and
    an electrolyte,
    wherein the positive electrode active material comprises a $Li_2MnO_3$—$LiMO_2$ solid solution, wherein the $Li_2MnO_3$—$LiMO_2$ solid solution is represented by the general formula: $Li_xNa_y[Li_{z1}Mn_{z2}M^*_{(1-z1-z2)}]O_{(2\pm\gamma)}$ $\{0.67<x<1.1, 0<y<0.1, 0<z1<0.33, 0.5<z2<0.95, 0\leq\gamma<0.1$, and M* indicates two or more transition metal elements including at least nickel and cobalt}, the solid solution showing two peaks in an X-ray diffraction pattern each having a peak top at a diffraction angle of 18° to 19° and satisfying $0.007 < R_{(B/A)} < 0.0231$, the $R_{(B/A)}$ is the ratio of the intensity B of one of the peaks on the higher angle side to the intensity A of the other peak on the lower angle side.

4. A method for manufacturing the positive electrode active material of claim 1, comprising:
    reacting sodium composite oxide represented by the general formula: $Na_\alpha[Li_{\beta1}Mn_{\beta2}M_{(1-\beta1-\beta2)}]O_{(2\pm\gamma)}$ $\{0.67<\alpha<1.1, 0<\beta1<0.33, 0.5<\beta2<0.95, 0\leq\gamma<0.1$, and M is at least one transition metal element including at least nickel and cobalt} with a lithium compound to exchange sodium ions in the sodium composite oxide with lithium ions.

5. The positive electrode active material for non-aqueous electrolyte secondary batteries according to claim 1, wherein the solid solution shows a peak in an X-ray diffraction pattern having a peak top at a diffraction angle of 20° to 25° assigned to a superlattice structure.

6. The non-aqueous electrolyte secondary battery according to claim 3, wherein the solid solution shows a peak in an X-ray diffraction pattern having a peak top at a diffraction angle of 20° to 25° assigned to a superlattice structure.

7. The positive electrode active material for non-aqueous electrolyte secondary batteries according to claim 1, wherein M* indicates nickel and cobalt.

8. The non-aqueous electrolyte secondary battery according to claim 3, wherein M* indicates nickel and cobalt.

* * * * *